United States Patent [19]

Egerton et al.

[11] Patent Number: 4,851,293

[45] Date of Patent: Jul. 25, 1989

[54] STABILIZED METALLIC OXIDES

[75] Inventors: Terence A. Egerton, Stockton on Tees; Kevin A. Fothergill, Darlington; Graham P. Dransfield, Stockton on Tees, all of England

[73] Assignee: Tioxide Group plc, London, England

[21] Appl. No.: 184,794

[22] Filed: Apr. 22, 1988

[30] Foreign Application Priority Data

Apr. 22, 1987 [GB] United Kingdom ............... 8709515

[51] Int. Cl.$^4$ ............................... B32B 18/00
[52] U.S. Cl. ................... 428/403; 501/103; 501/104; 501/105; 428/404; 427/214; 427/215; 423/600; 423/608
[58] Field of Search ............ 501/103, 104, 105; 423/600, 608; 428/403, 404; 427/214, 215

[56] References Cited

U.S. PATENT DOCUMENTS

| 3,066,391 | 12/1962 | Vordahl | 29/182.5 |
|---|---|---|---|
| 3,926,567 | 12/1975 | Fletcher et al. | 29/182.5 |
| 3,989,872 | 11/1976 | Ball | 428/404 |
| 4,626,518 | 12/1986 | Watanabe et al. | 501/105 X |
| 4,719,091 | 1/1988 | Wusirika | 501/103 X |

FOREIGN PATENT DOCUMENTS

| 0013599 | 7/1980 | European Pat. Off. . | |
|---|---|---|---|
| 0026666 | 4/1981 | European Pat. Off. . | |
| 0140638 | 5/1985 | European Pat. Off. . | |
| 0121969 | 9/1980 | Japan | 501/105 |
| 57-191234 | 11/1982 | Japan . | |
| 58-176127 | 10/1983 | Japan . | |
| 0162173 | 9/1984 | Japan | 501/105 |
| 1077665 | 9/1984 | Japan | 501/105 |
| 1234043 | 6/1971 | United Kingdom . | |
| 1256421 | 12/1971 | United Kingdom . | |
| 1392189 | 4/1975 | United Kingdom . | |
| 1395700 | 5/1975 | United Kingdom . | |
| 1417574 | 12/1975 | United Kingdom . | |
| 1491361 | 11/1977 | United Kingdom . | |
| 1491362 | 11/1977 | United Kingdom . | |
| 1519314 | 7/1978 | United Kingdom . | |
| 1589930 | 5/1981 | United Kingdom . | |
| 2181723 | 4/1987 | United Kingdom . | |
| 8203876 | 11/1982 | World Int. Prop. O. . | |

Primary Examiner—William R. Dixon, Jr.
Assistant Examiner—Karl Group
Attorney, Agent, or Firm—Banner, Birch, McKie & Beckett

[57] ABSTRACT

The stabilization of zirconia when used as a ceramic by various stabilizers has been known but a new and improved stabilized particulate zirconia has now been developed showing the important advantages.

The particulate zirconia now developed is coated with a hydrous oxide of titanium and/or of aluminium and with at least one hydrous oxide of yttrium, calcium, magnesium, strontium or cerium.

13 Claims, No Drawings

STABILIZED METALLIC OXIDES

This invention relates to stabilised metallic oxides and particularly to those stabilised by coating with a hydrous metal oxide.

Zirconium oxide is used in the manufacture of ceramic materials and during such manufacture the oxide is heated during which the crystal form of the oxide changes from the normal room temperature monoclinic habit to tetragonal and cubic forms depending on the temperature to which the oxide is heated. Under normal conditions only the monoclinic form of pure zirconia is stable at room temperature and unless steps are taken to stabilise the tetragonal or cubic forms these revert to the monoclinic form on cooling.

The presence of at least some of these high temperature tetragonal and cubic crystal habits is more desired in ceramics and steps have been taken in the past to improve the stability of these crystalline forms at room temperature. Such steps have included mixing the zirconia with a stabilising agent which becomes incorporated in the zirconia on heating the doped oxide and exerts a stabilising influence on the crystal formed when it is cooled to room temperature.

Such stabilised or partially stabilised compositions have been formed from zirconia by mixing the bulk zirconia powder with a stabilising agent such as yttrium oxide powder and subjecting the mix to calcination and grinding to form the appropriately sized stabilised ceramic material. Alternatively a mixture of zirconia and yttrium oxide has been formed by coprecipitating hydrous zirconia and hydrous yttria from aqueous solution to form intimate co-mixed hydrous oxides which are then calcined prior to grinding to obtain the mixed oxide ceramic composition. These methods of manufacture of stabilised compositions are very energy intensive in requiring calcination and grinding and in addition can lead to excessive crystal growth and/or reduced purity of the resultant powder.

It has been recognised that it would be desirable if stabilised zirconia could be obtained by an alternative method in which these hitherto disadvantages were to be substantially lessened.

According to the present invention a composition suitable for use in the manufacture of a ceramic material comprises particulate zirconia coated with a hydrous oxide of titanium and/or of aluminium and with at least one hydrous oxide of yttrium, calcium, magnesium, strontium or cerium.

The coated zirconia according to the present invention transforms to stabilised zirconia upon firing to form the ceramic body.

Depending on the method of production of the product the hydrous oxide of titanium and/or of aluminium may be present as a discrete inner layer of the hydrous titania and/or hydrous alumina surrounded by an outer layer or coating of the other hydrous oxide or hydrous oxides or alternatively the product may comprise the particulate zirconia in which the particles are coated with a layer of mixed hydrous titania and/or hydrous alumina and the other hydrous oxide or oxides as specified.

Particularly useful products comprise particulate zirconia having a size such that the majority of the particles have a diameter of less than or equal to 0.5 microns and preferably less than 0.2 microns.

The amount of the hydrous oxide of yttrium, calcium, magnesium, strontium, or cerium employed as a coating depends on two factors. Firstly the actual amount employed depends on the particular metal oxide deposited. The amount also depends on the degree of stability that it is desired should be imparted to the fired zirconia.

It will be clear from reading this specification that partial stabilisation of the zirconia is desirable in certain circumstances as is full stabilisation i.e. stabilising the product to the highest extend possible. Generally speaking for a partially stabilised product the amount of the hydrous oxide present as coating will be less than that required for a fully stabilised product. A particularly desirable degree of stabilisation corresponds to a body in which the predominant phase of zirconia is tetragonal. Such a product has been termed tetragonal zirconia polycrystals (TZP).

For a partially stabilised particulate zirconia it has been found useful that the amount of hydrous oxide of yttrium which is present is from 1 to 7 mole percent expressed as $Y_2O_3$ based. Most preferably for a partially stabilised product the amount of hydrous oxide of yttrium is from 1.5 to 5 mole % $Y_2O_3$ based on moles of zirconia. When the hydrous metal oxide is a hydrous oxide of calcium, magnesium or strontium then for a partially stabilised product it is desired that the amount of oxide is, generally speaking, from 4 to 14 mole % as oxide 4 to 14 mole % as oxide based on moles of zirconia. Preferably for a partially stabilised product the amount of the hydrous oxide of calcium, magnesium or strontium is from 6 to 12 mole % as oxide based. When the hydrous metal oxide is a hydrous oxide of cerium then for a partially stabilised product it is desired that the amount of the hydrous oxide is, generally speaking, from 2 to 18 mole %, expressed as $CeO_2$ based on moles of zirconia. Preferably for a partially stabilised product the amount of the hydrous oxide of cerium is from 6 to 12 mole % expressed as $CeO_2$ based on moles of zirconia.

In order that the treated product should be as fully stabilised as possible with respect to its crystal structure then it is desired that the amount of hydrous oxide of yttrium is from 5 to 10 mole %, preferably 6 to 9 mole % as $Y_2O_3$ based on moles of zirconia. Similarly to produce a fully stabilised treated zirconia the amount of hydrous oxide of calcium, magnesium or strontium is from 8 to 25 mole % and preferably from 12 to 20 mole % as oxide based. Where a hydrous oxide of cerium is to be used to produce a fully stabilised zirconia the amount of hydrous oxide of cerium is greater than 14 mole % and preferably greater than 18 mole % expressed as $CeO_2$ on moles of zirconia.

Naturally it is possible to deposit two or more different metal oxides selected from those of yttrium, calcium, magnesium, strontium or cerium, in addition to the hydrous titania and/or hydrous alumina, and in this case the aggregate amount deposited need not necessarily exceed the amount for an individual hydrous metal oxide.

The amount of hydrous oxide of titanium and/or aluminium deposited either as a discrete free coating or together with the other hydrous metal oxide, generally speaking, is from 0.2 to 15 mole %, preferably 0.3 to 5 mole % and most preferably from 0.5 to 2 mole % expressed as $TiO_2$ or $Al_2O_3$ based. In the case where both hydrous titania and hydrous alumina are present the amount is usually from 0.2 to 5 mole % and preferably from 0.5 to 2 mole % expressed as $TiO_2$ and $Al_2O_3$ based.

In accordance with the invention the particulate zirconium oxide used to form the basis of the material to be used as a ceramic is preferably formed by the vapour phase oxidation/hydrolysis of a vapourised zirconium compound. Typical zirconium compounds which can be oxidised or hydrolysed in the vapour state are the zirconium halides, particularly, zirconium tetrachloride and zirconium alkoxides. This is usually carried out by mixing the zirconium compound with an excess of heated oxygen or water vapour under such conditions that oxidation or hydrolysis of the zirconium tetrachloride takes place and the desired sized zirconia is obtained directly on cooling and separating from the gas stream. A preferred method of heating oxygen to react with the zirconium tetrachloride is to pass the the oxygen through an electric arc between two electrodes supplied with electrical power at an appropriate voltage and amperage which commonly generates a so-called electrical plasma. This form of manufacture of the particulate zirconia has an advantage in that the product is obtained in the oxide form directly and that the oxidation process can be controlled so that the particle size of the product is as near to the crystal size as it is possible to obtain without extensive grinding of the product being required before treatment with the coatings.

The product of the invention is obtained by treating the particulate zirconia in such a manner that the various hydrous oxides are deposited as coatings on the surface of the particles of zirconia. Preferably the coating operation is carried out as a wet treatment process in which, initially, the zirconium oxide particles are dispersed in water. It has been found that this dispersion can be effected directly by mixing the particles of zirconia with water without there being any requirement for a dispersing agent. This is advisable because it avoids any unnecessary contamination of the product with constituents of the dispersing agent. Generally speaking zirconium oxide obtained from the vapour phase oxidation of the zirconium halide is highly acidic when mixed with water and depending on the exact form of the particles of zirconia can produce a dispersion pH of the order of 1 clearly indicating the highly acidic dispersions.

As described the dispersion of the zirconia particles in water is effected normally by stirring with water and in an amount such that the obtained dispersion contains zirconia in a concentration of up to 400 gpl. Usually the amount of zirconia is not less than 50 gpl zirconia and a convenient concentration to employ in practice is 200 gpl of zirconia. It is, however, possible to improve the degree of dispersion by milling in, for example, a sand mill if desired.

To the aqueous dispersion of the particulate zirconia there is added a water soluble hydrolysable salt of titanium and/or aluminium in an amount sufficient to introduce on hydrolysis the required amount of hydrous oxide as coating. Typical water soluble salts which can be used are titanyl sulphate, titanyl aluminium sulphate, aluminium sulphate and aluminium nitrate. Precipitation of the hydrous oxide on the particles of zirconium oxide is effected by raising the pH of the solution to a value sufficiently alkaline to deposit the hydrous oxide and this treatment to increase the pH to deposit the hydrous oxide may be carried out, if desired, prior to the addition of any other water soluble compound which is to be used to deposit the other one or more hydrous oxides specified. However it is preferred to defer depositing the hydrous titanium and/or hydrous alumina coating on the zirconium oxide particles until after the other hydrolysable metal compounds have been mixed with the aqueous dispersion but it is preferred that the source of hydrous titania and/or hydrous alumina should be mixed with the aqueous dispersion of the zirconium oxide particles prior to mixing therewith with these other hydrolysable metal compounds.

As indicated after mixing of the water soluble hydrolysable compound of titanium and/or aluminium with the aqueous dispersion of particulate zirconium oxide there is added to the aqueous dispersion a water soluble hydrolysable compound of yttrium, calcium, magnesium, strontium, or cerium or any two or more of such compounds in an appropriate amount to introduce the required level of hydrous oxide of the particular specified metal. Typical hydrolysable compounds of yttrium which may be used are yttrium chloride, yttrium nitrate and yttrium sulphate. Typical water soluble salts of the other metals which can be employed depend on the particular metal but include the chlorides, nitrates, some sulphates and acetates. Another source of yttrium which can be used is prepared by dissolving yttrium oxide in an appropriate acid and using the solution without separation.

Although any suitable means of mixing the aqueous dispersion of zirconia particles with the hydrolysable metal compounds may be employed at different temperatures it is preferred that the coating process be carried out at a temperature of from 10° C. to 70° C.

After mixing of the various reagents with the aqueous dispersion of zirconium oxide the pH of the dispersion is raised to a value sufficient to precipitate the respective hydrous oxide coatings. The actual level to which the pH must be raised depends on the particular hydrous oxide to be deposited and for instance when the oxide is a hydrous oxide of yttrium then it is sufficient to raise the pH of the aqueous dispersion to a value within the range 7 to 9 to effect the precipitation of hydrous oxide from the hydrolysable metal compound. Where the hydrous metal oxide to be precipitated is calcium, magnesium or strontium then it has been found that an appropriate pH to effect this is within the range 8 to 12. Where the hydrous metal oxide to be precipitated is cerium, then it has been found that an appropriate pH to effect this is within the range 2 to 9.

The neutralisation and increase in pH of the acidic aqueous dispersion preferably is carried out by the addition of an appropriate alkali to the aqueous dispersion. It is most convenient if the alkali is ammonium hydroxide since this does not introduce any objectionable metallic ions into the solution and waste ammonia can be driven off by heating. For the deposition of hydrous oxides of titanium and/or aluminium the addition of ammonium hydroxide is eminently suitable and also can be used if hydrous yttrium or cerium oxide is deposited at about a pH of 9 or below. However where other hydrous metal oxides are being deposited then stronger alkali is necessary and usually an alkaline metal hydroxide is required such as sodium hydroxide or potassium hydroxide. However when such alkaline metal hydroxides are used it is necessary to wash the product adequately to remove any contaminating alkali metal ions. Normally the product obtained should not contain an alkali metal impurity level greater than 0.01% expressed as $M_2O$.

After deposition of the hydrous oxide coating the product is separated by filtering, washing as necessary and drying. If required the dried product may be ground to remove any aggregation that has occurred during processing.

The powdered product is eminently suitable for use in the manufacture of shaped ceramic bodies by firing.

The product in having the stabilising agent present as a coating provides a well distributed and intimate mixture of the agent and on firing good incorporation of the agent through the zirconia is achieved.

In order that the coated zirconium compound is most useful in the preparation of ceramic bodies it has been found that the amount of silica as impurity in the material should be less than 0.03% by weight $SiO_2$ by weight of $ZrO_2$ in the particulate material.

The invention is illustrated in the following Examples.

Example 1

Zirconium oxide particles of approximately 0.1 microns in diameter prepared by the vapour phase oxidation of zirconium tetrachloride were dispersed in water at a concentration of 100 gpl. As a result of the reaction of residual Zr-Cl groups with water the dispersion obtained had a pH value less than 1.

The dispersion was heated to 50° C. and an aqueous solution of titanyl sulphate (containing the equivalent of 35 gpl $TiO_2$) was added to the dispersion in an amount sufficient to introduce hydrous titania in an amount of 1% w/w as $TiO_2$ on solids. To the dispersion obtained there was then added an aqueous solution of yttrium chloride (containing the equivalent of 186 gpl $Y_2O_3$) in an amount sufficient to introduce 5.6% w/w $Y_2O_3$ on solids. The pH was raised with ammonium hydroxide solution 10% w/w to a value of 8.0 over a period of 45 minutes and the dispersion was then stirred for a further 30 minutes at a temperature of 50° C. The slurry was able to be filtered in a relatively short time and the filter cake washed, dried and milled for 18 hours in a ball mill in isopropyl alcohol at a concentration of 300 gpl using cylindrical zirconia grinding medium having a size of 1 cm x 1 cm. The grinding medium was removed by sieving and the alcohol evaporated on a water bath.

Analysis of the product showed the presence of the equivalent of 5.3% w/w $Y_2O_3$ and 0.8% w/w of $TiO_2$ in the form of the hydrous oxides as coating on the particles. High magnification electron micrographs were taken of the product and these show that most of the hydrous oxide was present on the particles of zirconium oxide as a coating with very little precipitated in the bulk form between the particles.

The produce was formed into a shaped ceramic body and fired at a temperature of about 1450° C. and after cooling it was found that the body remained intact. In the absence of such an addition of yttrium oxide the ceramic body cracked badly during cooling after firing.

The quality of the yttria/zirconia coated powder was assessed by single ended die-pressing the powder at 30 MPa (MegaPascals) into 15 discs of approximately 3 cm diameter. The discs were fired at 1450° C., for 1 hour, or longer. The strength of the unpolished discs (modulus of rupture) was measured by a three point biaxial test from which a mean value of 993 MPa (standard deviation of 15%) was derived. The density of the discs was measured by mercury densometry and a mean value of 5.95 g/cm$^3$ was obtained. This is 98% of the theoretical density.

Example 2

A sample of yttria coated zirconia powder was prepared in a manner similar to that described in Example 1 except that an aqueous solution of yttrium chloride (containing the equivalent of 186 gpl $Y_2O_3$) was added in an amount sufficient to introduce 4.7% w/w $Y_2O_3$ on solids.

Analysis of the product showed the presence of 4.5% w/w $Y_2O_3$ and 0.8% w/w of $TiO_2$ in the form of hydrous oxides as coating on the particles.

The product was tested as in Example 1 and the discs had a strength (modulus of rupture) of 1064 MPa (standard deviation of 13%).

The density of the discs was measured and found to be 5.91 g/cm$^3$. This is 98% of the theoretical density.

Example 3

A sample of yttria coated zirconia powder was prepared in a manner similarly to that described in Example 1 but without the coating of hydrous titania. Instead, the dispersion of zirconia was heated to 50° C. and an aqueous solution of aluminium sulphate (containing the equivalent of 68 gpl $Al_2O_3$) was added to the dispersion in an amount sufficient to introduce hydrous alumina in an amount of 1% w/w as $Al_2O_3$ on solids. An aqueous solution of yttrium chloride was added and the coated zirconia was produced as described in Example 1. The product was able to be filtered in a relatively short time.

Analysis of the product showed the presence of 5.2% w/w $Y_2O_3$ and 0.9% w/w $Al_2O_3$ in the form of hydrous oxides as coating on the particles.

The product was tested as in Example 1 and the discs had a strength (modulus of rupture) of 953 MPa (standard deviation of 13%).

The density of the discs was measured and found to be 5.95 g/cm$^3$. This is 98% of the theoretical density.

Example 4

A sample of yttria coated zirconia powder was prepared in a manner similar to that described in Example 3 except that an aqueous solution of yttrium chloride (containing the equivalent of 186 gpl $Y_2O_3$) was added in an amount sufficient to introduce 4.7 % w/w $Y_2O_3$ on solids.

Analysis of the product showed the presence of 4.5% w/w $Y_2O_3$ and 0.9% w/w $Al_2O_3$ in the form of hydrous oxides as coating on the particles.

The product was tested as in Example 1 and the discs had a strength (modulus of rupture) of 1022 (standard deviation of 11%).

The density of the discs was measured and found to be 5.85 g/cm$^3$. This is 97% of the theoretical density.

Example 5

Zirconium oxide particles of approximately 0.1 microns in diameter prepared by the vapour phase oxidation of zirconium tetrachloride were dispersed in water at a concentration of 150 gpl. As a result of the reaction of residual Zr-Cl groups with water the dispersion obtained had a pH value of less than 1.

An aqueous solution of titanyl sulphate (containing the equivalent of 71 gpl $TiO_2$) was added to the dispersion in an amount sufficient to introduce hydrous titania in an amount of 1% w/w as $TiO_2$ on solids. To the dispersion obtained there was then added aqueous solution of ceric ammonium nitrate (containing the equivalent of 8.7 gpl $CeO_2$) in an amount sufficient to introduce 12.3% w/w CeO₂ on solids. The pH was raised with ammonium hydroxide solution 10% w/w to a value of 8.0 over a period of 45 minutes and the dispersion was then stirred for a further 30 minutes at a temperature of 50° C. The slurry was able to be filtered in a relatively short time and the filter cake washed dried and milled for 18 hours in a ball mill in isopropyl alcohol at a concentration of 300 gpl using zirconia grinding medium having a size of 1 cm×1 cm. The grinding medium was removed by sieving and the alcohol evaporated on a water bath.

The product was tested as in Example 1 and the discs had a strength (modulus of rupture) of 812 MPa Standard deviation of 3%).

The density of the discs was measured and found to be 6.01 g/cm³. This is 97% of theoretical density.

The foregoing data strongly suggested a tetragonal product. This was confirmed by X Ray Diffraction Studies, which showed the product to be 97.4% tetragonal. Examination by Scanning Electron Microscopy of the sintered surface of the disc, showed the mean grain size to be greater than 2 um. This was remarkable because it had been hitherto understood that tetragonal phase stabilization for zirconia, containing the stated level of ceria (or more up to 14 mol %), is only achieved for sintered products having a mean grain size of, at most 2 um. It is known that yttria stabilized zirconias containing added titania, have enhanced strength, whilst having a larger grain size, when compared to those containing yttria only. It is therefore believed that the remarkable stabilisation of ceria stabilised zirconia, in this example, is due to the presence of the coating titania.

Example 6

A sample of ceria coated zirconia powder was prepared in a manner similar to that described in Example 5 but without the coating of hydrous titania. The product filtered slowly and was tested as described in Example 1. The discs gave a strength (modulus of rupture) of 312 MPa and a standard deviation of 25%. The density of the discs was measured and found to average 5.84 g/cm³ which was 94% of the theoretical value. Examination by Scanning Electron Microscopy of the sintered surface of the disc showed the mean grain size to be greater than 2 um. X Ray Diffraction Studies showed it to be 93.7% monoclinic. The product, therefore, conformed to previous understandings. It is clear that the presence of hydrous titania as a coating is advantageous and in this example the omission of such it is believed resulted in poorer distribution of the hydrous oxide of cerium.

Example 7

A sample of yttria coated zirconia powder was prepared in a manner similar to that described in Example 1 but without the coating of hydrous titania. The product filtered very slowly and was tested as described in Example 1 and the discs had a strength (modulus of rupture) of 645 MPa. The density of the discs was 5.80 g/cm³ which was 95% of the theoretical value. It is clear that the presence of hydrous titania as a coating is advantageous and in this example the omission of such it is believed resulted in poorer istribution of the hydrous oxide of yttrium.

Example 8

This is a description of a prior art process and comparison with the product of Examples 1 and 2.

Zirconium oxide particles (0.1 microns) were mixed with 5% aw/w of yttrium oxide and milled in a ball mill for 18 hours at a concentration of 300 gpl in isopropyl alcohol with zirconia grinding medium having a size of 1 cm×1 cm. The grinding medium was removed by sieving and isopropyl alcohol removed by heating on a water-bath. As described in Example 1 pressed discs were produced and strength tested giving a fired strength of 267 MPa (standard deviation of 31%).

The density of the discs was measured by Mercury Densometry and a mean value of 5.47 g/cm³ obtained. This was 90% of the theoretical density.

The difference between the results of the measurements of the products of Examples 1 to 6 and 7 and 8 is significant and indicates that the product of the invention (Examples 1 and 2) is superior to prior products.

We claim:

1. A composition suitable for use in the manufacture of a ceramic material which comprises particulate zirconia coated with a hydrous oxide of titanium and/or aluminium and with at least one other hydrous oxide selected from the group consisting of yttrium, calcium, magnesium, strontium and cerium.

2. A composition according to claim 1 in which the hydrous oxide of titanium and/or aluminium is present as a discrete inner coating layer surrounded by an outer layer of the at least one other hydrous oxide.

3. A composition according to claim 1 in which the particulate zirconia is coated with a layer of mixed hydrous oxides of titanium and/or aluminium and the at least one other hydrous oxide.

4. A composition according to claim 1 in which said particulate zirconia has a size such that the majority of the particles have a diameter of less than or equal to 0.5 micron.

5. A composition according to claim 1 in which a hydrous oxide of yttrium is present in an amount of from 1.00 to 7.00 mole percent expressed as $Y_2O_3$ based on moles of zirconia.

6. A composition according to claim 1 in which a hydrous oxide of calcium, magnesium or strontium is present in an amount of from 4 to 14 mole percent as oxide based on moles of zirconia.

7. A composition according to claim 1 in which a hydrous oxide of cerium is present in an amount of from 2 to 18 mole percent $CeO_2$ based on moles of zirconia.

8. A composition according to claim 1 in which a hydrous oxide of yttrium is present in an amount of from 5 to 10 mole percent $Y_2O_3$ based on moles of zirconia.

9. A composition according to claim 1 in which a hydrous oxide of calcium, magnesium or strontium is present in an amount of from 8 to 25 mole percent as oxide based on moles of zirconia.

10. A composition according to claim 1 in which a hydrous oxide of cerium is present in an amount greater than 18 mole percent as $CeO_2$ based on moles of zirconia.

11. A composition according to claim 1 in which a hydrous oxide of titanium and/or a hydrous oxide of aluminium is present in an amount of from 0.2 to 15 mole percent as $TiO_2$ and/or $Al_2O_3$ based on moles of zirconia.

12. A method for the manufacture of a composition suitable for use in the manufacture of a ceramic material which comprises mixing particulate zirconia in the form of an aqueous dispersion with a water soluble hydrolysable salt of titanium and/or aluminium and precipitating a hydrous oxide of titanium and/or aluminium on said particles and mixing also therewith at least one other water-soluble hydrolysable salt selected from the group consisting of water-soluble hydrolysable salts of yttrium, calcium, magnesium, strontium and cerium and precipitating a hydrous oxide thereof on said particles of zirconia.

13. A method according to claim 12 in which the hydrolysable salt of titanium and/or aluminium is mixed with the aqueous dispersion of zirconia and a hydrous oxide of titanium and/or aluminium precipitated on said particulate zirconia prior to the addition of the at least one other water-soluble hydrolysable salt.

* * * * *